(No Model.) 2 Sheets—Sheet 1.

J. D. BURLIE.
CORN HARVESTER.

No. 316,943. Patented May 5, 1885.

WITNESSES:
Chas. H. Blanchard
P. H. Mazraille

INVENTOR,
J. D. Burlie
BY J. C. Higdon
ATTORNEY.

N. PETERS, Photo-Lithographer, Washington, D. C.

(No Model.)  2 Sheets—Sheet 2.

J. D. BURLIE.
CORN HARVESTER.

No. 316,943. Patented May 5, 1885.

WITNESSES:  INVENTOR,
J. D. Burlie
BY J. C. Higdon
ATTORNEY.

UNITED STATES PATENT OFFICE.

JOHN D. BURLIE, OF KANSAS CITY, MO., ASSIGNOR OF THREE-FOURTHS TO JOSEPH B. F. CATES, HANS LUND, AND MARCUS S. TYLER.

CORN-HARVESTER.

SPECIFICATION forming part of Letters Patent No. 316,943, dated May 5, 1885.

Application filed April 8, 1884. (No model.)

*To all whom it may concern:*

Be it known that I, JOHN D. BURLIE, of Kansas City, Jackson county, Missouri, have invented a new and useful Corn, &c., Harvester, of which the following is a full, clear, and exact description.

The object of the invention is to provide a machine for cutting corn and sugar-cane in such a manner as not to injure the quality of the same, and while operating upon corn in the field to deliver the stalks from the machine in the form of suitably-tied bundles or shocks. Sugar-cane is delivered by the apparatus directly into wagons that are kept alongside thereof, and without subsequent handling it is hauled to the crushing-mill. There are one or more driving or ground wheels arranged through the medium of suitable gears and framing to drive horizontally-revolving cutting-knives. A suitable reel causes the stalks to fall backward upon elevating-belts, which deliver them either into a wagon or directly to the frame of the shocker, in which latter position they are tied into a bundle of suitable size and dumped therefrom to the ground.

Reference is to be had to the accompanying drawings, forming part of this specification, in which similar letters of reference indicate corresponding parts.

Figure 1:
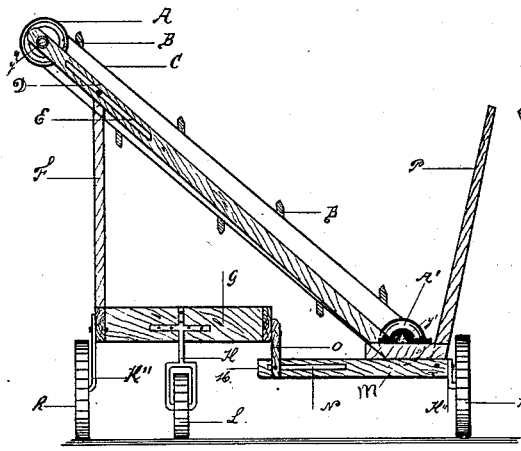
Figure 2:
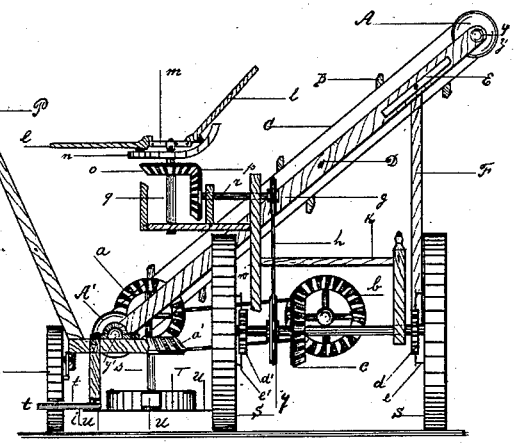
Figure 3:
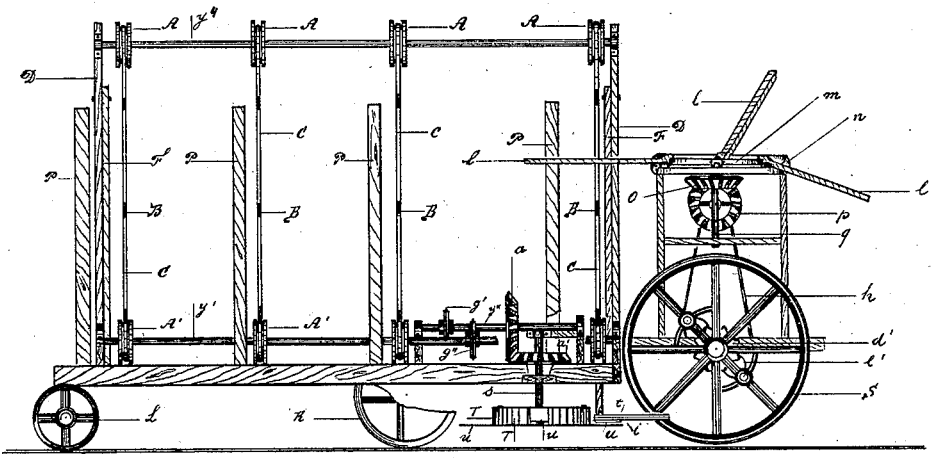
Figure 4:
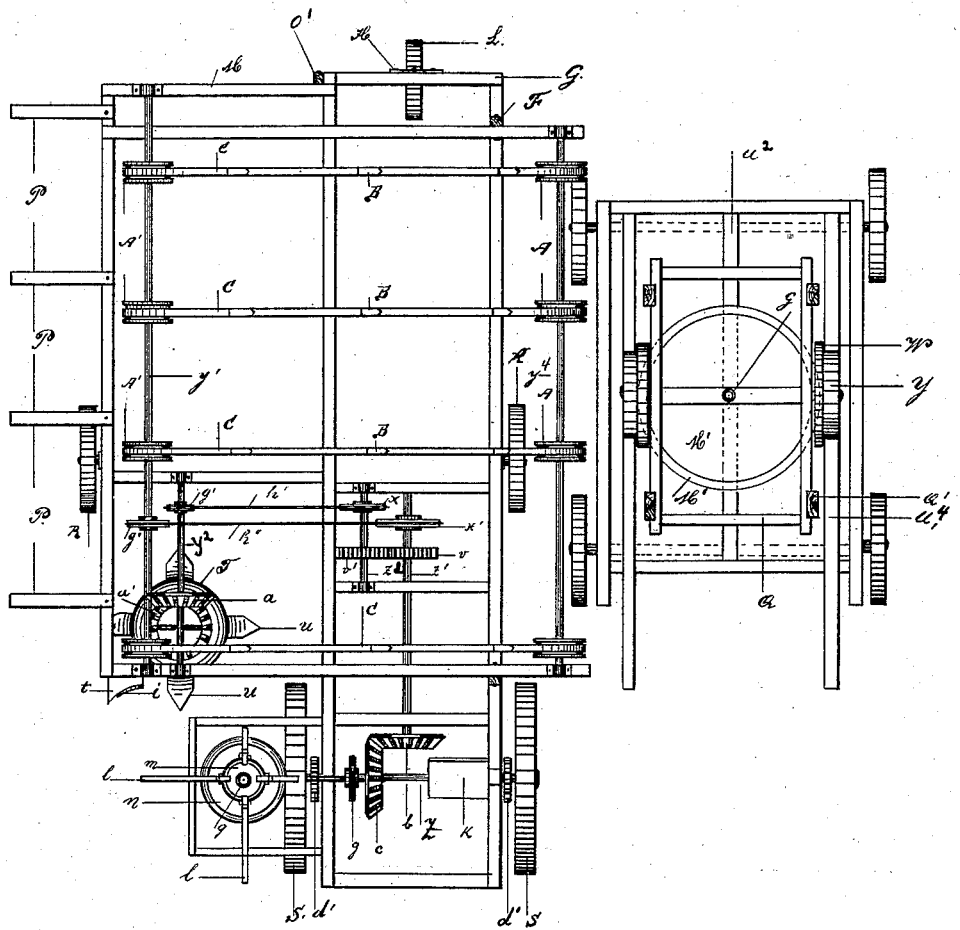
Figure 5:
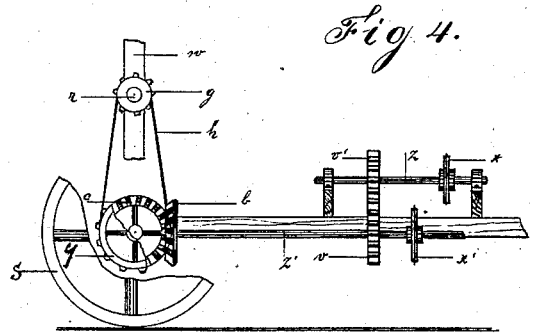
Figure 6:
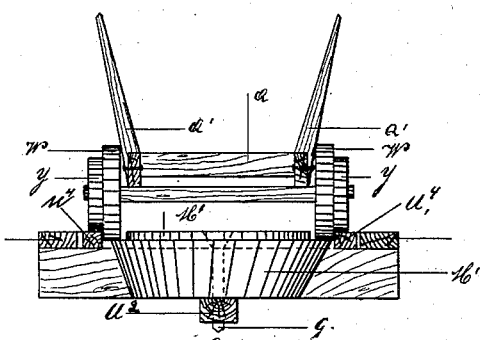

Figure 1 is a rear elevation of the machine, in which is shown the inclined elevating apparatus; and Fig. 2 is a front elevation of the same, exhibiting the general arrangement of the parts. Fig. 3 is a side elevation of the parts shown in Fig. 2. Fig. 4 is a plan view of the apparatus, and exhibits the position of the shocker when arranged upon a wagon. Fig. 5 shows in detail elevation part of the driving-gearing. Fig. 6 is an end elevation of the revolving shocker.

S represents the driving-wheels fixed upon the axle Z, and adapted to be attached to or detached therefrom by means of the ratchet-wheels $d'$ and pivoted pawls $e$. Upon this axle are keyed the main bevel gear-wheel $c$ and the chain or belt wheel $y$, which carries the chain $h$, that drives the short shaft $r$ and the reel-gearing $o$ $p$. In the latter gearing the short vertical shaft $g$ carries upon its upper end the arm-disk $m$, in which the reel-arms $l$ are pivoted, and they operate upon the cam-surface $n$ in the usual manner.

Power is communicated from the main gears $c$ $b$ to the longitudinal shaft $Z'$, carrying the gear-wheel $v$ and chain-wheel $x'$, thence to the shorter shaft $Z^2$, carrying pinion $v'$ and chain-wheel $x$, which, by means of chain or belt $h'$, running over the wheel $g'$ upon the shaft $y''$, drives the bevel-gears $a$ $a'$ and the vertical cutter-shaft $s$, carrying upon its lower extremity the cutter-head T. This rotary head has fixed thereto one or more projecting knives, $u$, which same operate in close proximity to the guard-finger $t$ $i$. The before-mentioned chain-wheel $x'$ and chain or belt $h''$ drive the lower shaft, $y'$, of the elevating apparatus through the chain-wheel $g''$. This shaft carries grooved pulleys $A'$.

Upon the upper end of the inclined frame D, which same is adjustable for varying heights by means of the slots E and braces F, is journaled the shaft $y^4$, carrying the grooved pulleys A, and this shaft, in connection with the before-described lower shaft, $y'$, and the belts C, having the blocks B attached thereto, constitutes the means for elevating and depositing the previously-cut stalks upon the shocker-frame Q, in which position, after being tied by hand or otherwise bundled, the revolving cart, which is composed of the frame Q, standards $Q'$, and a pair of flanged wheels, W Y, is turned to a right angle from its normal position, which operation is easily accomplished by reason of the entire weight of the cart being upon the turn-table $H'$, and its action dumps the bundle of stalks to the ground in an upright position. The turn-table $H'$ has the center-pin G, and its weight is borne upon the timber $u^2$.

The before-described cart may be moved in a straight line upon the track $u^4$ for convenience in loading.

The vertical timbers P act as guards to prevent the stalks from falling off the machine as they are laid upon the elevator-frame. In addition to the drive-wheels S, there are attached, one upon each side of the main framing, the supporting-wheels R by means of brackets $K''$.

The framing is adjusted laterally for varying widths by means of the slot N within the end timbers, M O.

The shocker may be fixed to and made a part of the machine; but, however, it is preferably used in the manner before described.

If desired, the straight track $u^4$ can be placed at a right angle to the position shown, so that its loaded cart may deposit the shocks at some distance from the side of the wagon.

The bracket H carries the rear wheel, L.

Having thus described my invention, I claim as new and desire to secure by Letters Patent—

In a cane-harvester, the laterally-adjustable framing, in combination with the main axle carrying the driving-wheels S, bevel-gear $c$, and reel-driving pulley $y$, the longitudinal shaft $Z'$, carrying gear $v$ and the elevator-driving pulley $x'$, the knife-driving shaft $Z^2$, carrying pinion $v'$ and pulley $x$, the vertical shaft $s$, carrying the cutter-head T, bevel-gear $a'$, and pulley $g'$, substantially as described.

In testimony whereof I affix my signature in presence of two witnesses.

JOHN D. BURLIE.

Witnesses:
AMOS H. KAGY,
MILTON CAMPBELL.